United States Patent Office.

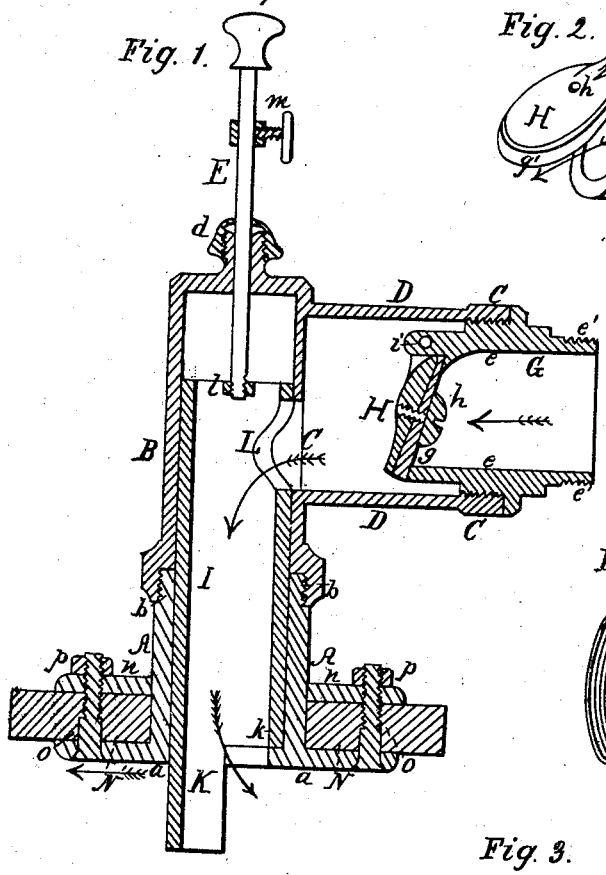
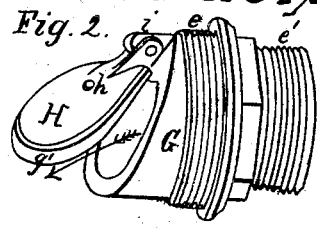
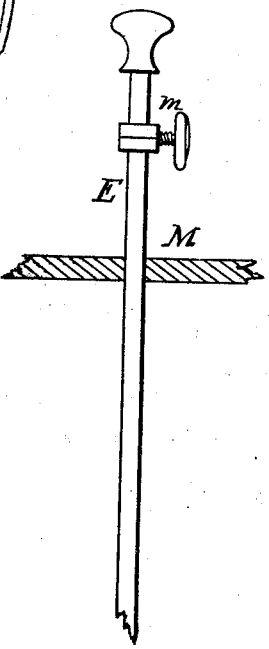
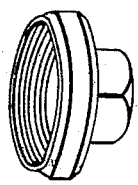
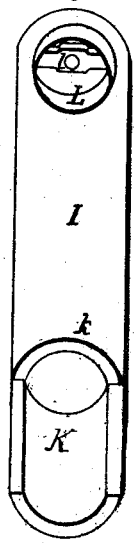
T. W. Fox.
Bilge Water Discharge.
No. 63,496. Patented Apr. 2, 1867.
Witnesses.
E. H. Baldwin.
R. Fitzgerald
Inventor.
Thos. W. Fox

THOMAS W. FOX, OF NEW LONDON, CONNECTICUT.

*Letters Patent No. 63,496, dated April 2, 1867.*

IMPROVED APPARATUS FOR EXPELLING WATER FROM THE HOLDS OF VESSELS.

*The Schedule referred to in these Letters Patent and making part of the same.*

TO ALL WHOM IT MAY CONCERN:

Be it known that I, THOMAS W. FOX, of the city and county of New London, in the State of Connecticut, have invented a new and useful improvement in my Device or Apparatus for Expelling Water from Sailing or Steam Vessels, patented June 12, 1866; and I do hereby declare that the following is a full, clear, and exact description of the construction, character, and operation of the same, reference being had to the accompanying drawings, which make part of this specification, in which—

Figure 1 is a section of the whole apparatus cut vertically through the centre, showing the relative positions of the parts.

Figure 2 is a perspective view of the valve-box and valve with its packing and seat.

Figure 3 is a perspective view of the cylindrical vacuum-producer.

Figure 4 is a perspective view of the rod or shaft by which the cylindrical vacuum-producer is raised and lowered.

Figure 5 is a perspective view of a cap, which may be screwed on to protect the valve while the vessel is at rest.

My improvement on my invention patented June 12, 1866, consists in elongating the main or outside cylinder, and fitting to its side a collar or horizontal tube; and in fitting a valve into this horizontal tube, to open toward the main cylinder, so that the pressure of water attempting to enter the vessel will close the valve, while the pressure of the water passing out of the vessel will open the valve; and by prolonging the cylindrical vacuum-producer, so that a portion of it may be a perfect cylinder, fitted to close the aperture in the side of the main cylinder securely against leaking, even if the valve should be forced open or removed; and in attaching a suitable rod or shaft to the upper end of the vacuum-producer, by which it may be elevated or depressed at pleasure.

I make all of the parts of bronze, or any other suitable material that is well calculated to resist the action of the water and other exposure. I cast the lower portion A A of the main or outside cylinder in one piece, with its flange $a\ a$, and cut or form at its upper end a male screw, as shown at $b\ b$, substantially as described in my before-mentioned patent; and I cast the upper portion B of this main cylinder of equal internal calibre with the lower part, attach the parts together by means of the screw, as represented at $b\ b$, and in the upper part of its side I cast or make an orifice, as shown at C. Over and enclosing this orifice C I fit or cast in one piece with the main cylinder a collar or horizontal tube, with a female screw in the outer end, as represented in section at $c\ c$; and at the upper end of the main cylinder I fit a stuffing or packing-box, as shown at $d$, through which the rod or shaft E works, to raise or lower the cylindrical vacuum-producer, all as represented in fig. 1. I make the valve-box and seat G, with its male screws $e$ and $e'$, substantially in the form shown in fig. 2, and in section in fig. 1, with the valve or clapper made of a plate of metal, as shown at H, to which I secure the packing $g$ by means of a screw, as shown at $h$, figs. 1 and 2, which clapper I attach to the box G by means of a hinge or joint, as shown at $i$, figs. 1 and 2; or, the valve may be of any other suitable form and attachment; and the valve-box should be screwed into its place with the hinge exactly at the top, as shown in fig. 1, so that its weight will tend to keep it closed. I make the cylindrical vacuum-producer substantially of the shape or form shown in fig. 3, and indicated in section in fig. 1; that is, I make the lower part semi-cylindrical for such a length that, when its rear projection $k$ rests on the flange $a$, as shown in section in fig. 1, its lower end K will pass down into the water a distance about equal to its diameter; and near the upper end I make a hole or aperture, as shown at L, which must exactly correspond to the aperture or orifice C in the main cylinder, as indicated in section in fig. 1, while the middle is a complete cylinder, as shown at I, fig. 3; and at the top I fit a cross-bar, as shown at $l$, figs. 1 and 3, into which the rod or shaft E is to be screwed or otherwise attached, to raise or lower the vacuum-producer, as indicated in fig. 1. I make the rod or shaft E, figs. 4 and 1, of suitable strength to raise and lower the vacuum-producer I K, fig. 3, and screw its lower end into the cross-bar $l$, as shown in fig. 1, having it pass water-tight through the stuffing-box $d$; and I make it long enough to reach to the most convenient place for working it; and I fit upon it a sliding collar, to be tightened with a binding screw, as shown at $m$, figs. 1 and 4, to secure it in its place when the vacuum-producer is drawn up. If desired, this shaft E may pass through the deck, as indicated at M, fig. 4, or through more than one deck; and the binding screw may be worked by a rod passing along the side of the rod E, and using a rack and pinion or bell-crank, so that it may be operated at any point from the hold or lower cabin to the upper deck, so that no time need be lost. I make the cap, fig. 5, to screw on to the valve-box at e', &c., when the apparatus is not in use.

Having constructed the several parts as described, I cut a suitable hole in the bottom N of the vessel, and insert the lower portion A A of the main cylinder from the under side, and force it up until the flange a a touches the bottom plank, (taking care to insert it so that the convex side of the vacuum-producer shall be toward the bow.) I then put on the flange n n on the inside of the vessel, put in a suitable number of screw-bolts, as o o, and turn on the nuts, as p p, and screw the cap, fig. 5, on to the thread b b, when the whole will be safely protected until wanted for use, and will be ready to receive the movable parts.

To fit it for use I unscrew the cap, fig. 5, insert the vacuum-producer, fig. 3, put on the upper portion B of the main cylinder, with the horizontal tube D D attached, and the valve-box G and valve H in their proper positions, and then insert the rod E, fig. 4. I then draw up the shaft or rod E till the lower end K of the vacuum-producer is on a level with the flange a a, and drop the collar m down to the stuffing-box d, (or to any one of the decks, or any other proper support,) and turn in the binding screw, when the complete cylindrical part I will cover and entirely close the orifice C in the main cylinder, so that no water can pass either way. Should the vessel make water by leaking or shipping a sea when the vessel is running ahead, I release the binding screw m, and, by the rod E, force or let down the vacuum-producer I K to the position represented in section in fig. 1, which will cause the orifice L to correspond with C, when the forward motion of the vessel will force the convex surface (opposite K) through the water, and thereby form a vacuum on the concave side, (or toward the stern,) when the water within the vessel will force open the valve H, as represented in fig. 2, and the water will pass out, in the direction indicated by the darts, with the rapidity due to the size of the orifice and the velocity of the vessel through the water, as set forth in my before-mentioned patent. Should the vessel lose its headway by accident or design the vacuum would cease, and the tendency of the water would be to force itself into the vessel; but that force would instantly close the valve H, as represented in section in fig. 1, and prevent the entering of any water into the vessel; and, when desired, the vacuum-producer can be raised by the rod E, so that the cylinder I will close the aperture C, when no water can enter the vessel.

The principal advantages of my present improvements over those which I patented June 12, 1866, consist in the great addition, safety, and convenience of the use of the valve; and in the use of the rod E, by which I raise or lower the vacuum-producer; and in so constructing the vacuum-producer that, when it is drawn up, the part I will perfectly close or cover the orifice C in the main cylinder.

What I claim as my invention, and desire to secure by Letters Patent, is—

1. The combination of the valve with the cylindrical vacuum-producer, when they are constructed, arranged, and fitted for use substantially as herein described and set forth.

2. I claim the combination of the cylindrical vacuum-producer with the elongated main cylinder, when they are so constructed and fitted to each other that, when the part K of the cylindrical vacuum-producer is raised out of the water, the part I will close the aperture C in the main cylinder, substantially as herein described and set forth.

3. I claim the combination of the cylindrical vacuum-producer with the rod E and its collar and binding screw m, when they are so arranged and connected that the cylindrical vacuum-producer may be raised or lowered by the rod E, and may be secured at any desired elevation by the collar and binding screw, (or any other analogous device,) substantially as herein described and set forth.

THOS. W. FOX.

Witnesses:
E. W. BALDWIN,
R. FITZGERALD.